(12) United States Patent
Dearing

(10) Patent No.: US 7,664,653 B2
(45) Date of Patent: Feb. 16, 2010

(54) SYSTEM AND METHOD FOR ELECTRONIC, WEB-BASED, ADDRESS ELEMENT CORRECTION FOR UNCODED ADDRESSES

(75) Inventor: Stephen M. Dearing, Cordova, TN (US)

(73) Assignee: United States Postal Service, Washington, DC (US)

( * ) Notice: Subject to any disclaimer, the term of this patent is extended or adjusted under 35 U.S.C. 154(b) by 382 days.

(21) Appl. No.: 11/212,808

(22) Filed: Aug. 29, 2005

(65) Prior Publication Data

US 2006/0058914 A1 Mar. 16, 2006

Related U.S. Application Data

(60) Provisional application No. 60/606,141, filed on Sep. 1, 2004.

(51) Int. Cl.
G06Q 10/00 (2006.01)
G06F 17/00 (2006.01)
G06K 9/00 (2006.01)
G06F 12/00 (2006.01)

(52) U.S. Cl. .................... 705/1; 705/401; 707/201; 382/101

(58) Field of Classification Search .......... 705/1, 705/401; 707/201; 382/101
See application file for complete search history.

(56) References Cited

U.S. PATENT DOCUMENTS

| 5,422,821 | A * | 6/1995 | Allen et al. ............... 700/219 |
| 6,131,101 | A * | 10/2000 | Maitino et al. ............ 707/201 |
| 6,741,724 | B1 * | 5/2004 | Bruce et al. ............... 382/101 |
| 2004/0015493 | A1 | 1/2004 | Garner et al. |
| 2004/0133443 | A1 | 7/2004 | Payne et al. |
| 2004/0225543 | A1 | 11/2004 | Kapochunas et al. |
| 2005/0004754 | A1 * | 1/2005 | Hayes ....................... 701/209 |
| 2005/0004882 | A1 | 1/2005 | Teichgraber et al. |
| 2005/0075988 | A1 * | 4/2005 | Cordery et al. ............ 705/404 |
| 2005/0137991 | A1 | 6/2005 | Bruce et al. |

FOREIGN PATENT DOCUMENTS

| JP | 2000279894 A | * | 10/2000 |
| JP | 2002273347 A | * | 9/2002 |

OTHER PUBLICATIONS

Anchor Computer, "NCOA" Anchorcomputer.com Innovative Solutions for Direct Marketers; Sep. 6, 2001 http://web.archive.org/web/20010906224040/www.anchorcomputer.com/Services/ncoa_description.asp.*
International Search Report dated Mar. 29, 2007, in International Application No. PCT/US05/30752.
Written Opinion of the International Searching Authority dated Mar. 29, 2007, in International Application No. PCT/US05/30752.
International Preliminary Report on Patentability (and Notice thereof).

* cited by examiner

*Primary Examiner*—John W Hayes
*Assistant Examiner*—Fadey S Jabr
(74) *Attorney, Agent, or Firm*—Lewis and Roca LLP

(57) ABSTRACT

Systems and methods for correcting addresses to contain a code representing a delivery segment (ZIP+4™ code) within a defined geographic location (ZIP Code™) include determining whether the address is already matched with a ZIP+4™ code and contains a valid delivery point. Further, if a match the address cannot be made, the systems and method may correct or adjust the address and check if a match can be made after correcting and/or adjusting the address. If no match can be made after correcting and/or adjusting, the systems and methods may send the address to a district office and/or delivery unit to determine the ZIP+4™ code and the delivery point.

14 Claims, 3 Drawing Sheets

SYSTEM AND METHOD FOR ELECTRONIC, WEB-BASED, ADDRESS ELEMENT CORRECTION FOR UNCODED ADDRESSES

RELATED APPLICATION

The present application is related to and claims priority of U.S. Provisional Application No. 60/606,141 filed on Sep. 1, 2004, in the name of Stephen M. DEARING and titled SYSTEM AND METHOD FOR ELECTRONIC, WEB-BASED, ADDRESS ELEMENT CORRECTION FOR UNCODED ADDRESSES, the contents of which are fully incorporated herein by reference.

TECHNICAL FIELD

The present invention relates generally to a system and method for electronically correcting addresses and more particularly to a system and method for electronically correcting addresses using a web-based address element correction process.

BACKGROUND

Currently, postal delivery services such as the United States Postal Service™ (the U.S. Postal Service™) deliver mail items to recipients based upon an address affixed or labeled onto the mail item. The address may contain identifying information such as a name, a street, a city, a state, and a ZIP Code™, which in combination may specify a specific delivery point. The ZIP Code™ may represent a geographic location in the United States and have a five (5) digit designation. For example, the ZIP Code™ of 20001 represents a particular geographic location in Washington, DC. Additional digits may be added to the ZIP Code™ to further specify a more exact delivery segment within the geographic location. A ZIP+4™ code may be such a designation and may represent a specific delivery segment within the geographic location identified by the ZIP Code™.

Having the additional four (4) digits on the ZIP+4™ code may allow more efficient sorting and delivery of an item (e.g., a letter, package, etc.) through a process for delivering mail within the U. S. Postal Service™. Incentives for using the ZIP+4™ code may also be offered to customers. For example, high volume customers using the U.S. Postal Service™ may receive discounts for providing a ZIP+4™ code on a mail item. The ZIP+4™ code allows the U.S. Postal Service™ to more efficiently sort and deliver the mail, thus saving money due to a reduction of operating costs. Further, these savings may be passed along to the customers using the ZIP+4™ code. Therefore, it may be desirable to code all addresses with a ZIP+4™ code, where possible, because the sorting and delivery of mail will be more efficiently handled.

Inherent in the business of delivering mail items are problems associated with incorrect or inaccurate addresses associated with the mail items. In the past, addresses were corrected by manual means. For example, if a mailer had an inaccurate or incorrect address, the mailer could submit their mail list to a District Address Management Systems department in the U.S. Postal Service™ who would attempt to correct the inaccuracy. In correcting the address, the department would additionally attempt to match the address with a corresponding ZIP+4™ code.

For manual correction, the District Address Management Systems department would send a hard copy form to delivery units throughout the United States. The delivery units may be local post offices for a particular ZIP Code™. The delivery units filled out the hard copy forms with correct address information, which included indicating a ZIP+4™ code, and mailed the forms back to the District Address Management Systems department. The corrected addresses, with the proper ZIP+4™ code designation, would be returned in hard copy to the mailer for their entry into their central repository by data entry personnel.

Another attempt to update mailer addresses included sending deficient addresses to delivery unit computers. In this attempt, address records were sent electronically to delivery unit computers and delivery unit personnel would print out the address record on a hard copy, make corrections on the hard copy including the ZIP+4™ code, and mail the corrections to an Address Element Correction department at a National Customer Support Center associated with the United States Postal Service™. Once received, the corrections and ZIP+4™ were keyed into a central repository by data entry personnel.

Several disadvantages arose from these attempts to update and correct the central repository including the following. First, delivery units failed to respond to the hard copy mailings and addresses were not corrected. Second, there was not an easy or efficient way to track the information being sent so that performance could be measured. Therefore, not only were delivery units failing to respond to the requests for correction of addresses, there was no way to hold the delivery units accountable for their failure to respond to the requests.

Thus, it is desirable to provide an electronic and automated system to deliver addresses that need correction to delivery units and allow electronic revisions to the addresses by the delivery unit. Tracking of the actions taken at the delivery unit allows management to assign accountability for the correction of address records.

SUMMARY

Disclosed is a method of matching a code, representing a delivery segment within a geographic location, to an address within the geographic location. The method includes determining that an address is incorrect by failing to match a code to the address and sending the incorrect address to a website operated by a server. The method also includes sending a transmission to a district office from the server requesting correction of the incorrect address and determining a code associated with the incorrect address and correcting the incorrect address to reflect the associated code. The method further includes sending the corrected address to a database.

There is also provided a system of assigning a code, representing a delivery segment within a geographic location, to an address within the geographic location. The system includes a server configured to operate a website, the website configured to post the address and a computer, resident in a district office, configured to communicate with the server, to receive information relating to the address, and to correct the address to reflect the associated code. The system also includes a database configured to receive the corrected address.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
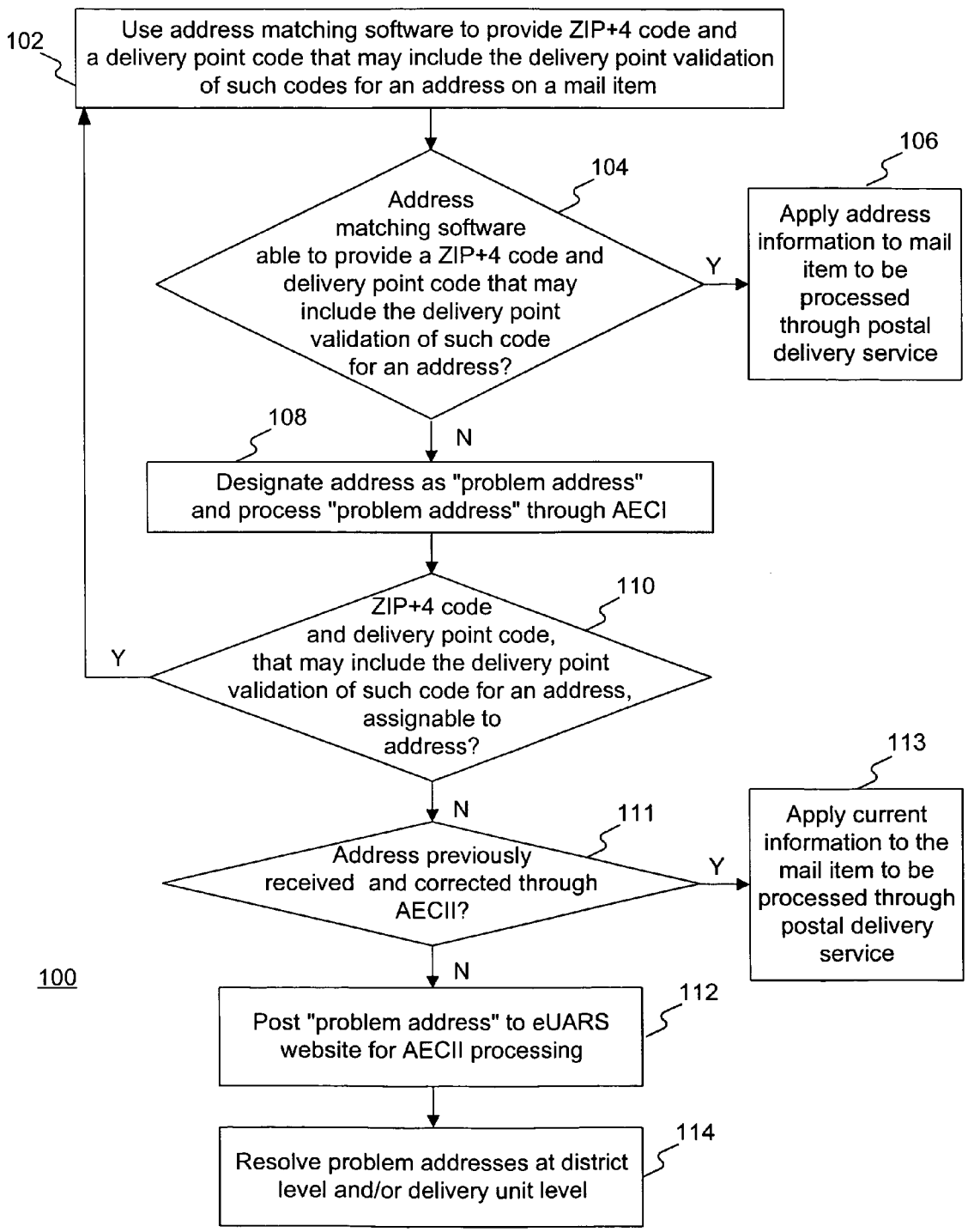
FIG. 1 is a flow chart of a method consistent with an embodiment of the present invention.

FIG. 1 is a flowchart of a method 100 showing the tasks and steps of correcting addresses using a web-based address element correction process.

Method 100 begins at stage 102, where customers (or mailers) may send items for delivery or mailing to a carrier. The carrier, such as for example the U.S. Postal Service™, may handle the sorting and delivery of the items for mailing. The mailers may send mail items to recipients using an address matching software based on information supplied by the carrier. For example, the mailer may use a computer to input the recipient's address and the address matching software may match that inputted address to provide additional information that may aid in more effectively sorting and delivering the mail item. The address matching software may provide a ZIP+4™ code to the mail item corresponding to a recipient's address provided by the mailer on the mail item. The address matching software may be a CASS-certified™ address matching software program. CASS certification is used by the U.S. Postal Service™ to test third party software for compliance of postal addressing and matching logic. The CASS™ software may additionally provide delivery point information (or a delivery point code) and a respective check digit. For example, the delivery point information may be derived from the last 2 digits of the address number or through algorithms invoked when there are multiple apartment or suite numbers at the same address. The check digit may provide a means for determining that the information is in a correct format. The carrier may use any other services that check compliance with certain rules associated with the carrier in delivering mail items.

At stage 104, a determination is made of whether the address matching software is able to make a match and assign a ZIP+4™ code. The software may find the most correct match according to certain rules or return a "no match" flag. A match may be considered when the address information falls within the address low and address high for a street range as existing in the U.S. Postal Service™ ZIP+4™ product. If an address does not fall within a valid ZIP+4™ street range it may be considered a no match.

At stage 106, if the address matching software is able to provide a match (e.g., a ZIP+4™ code and/or a delivery point code) for the address, the match may be applied to a mail item, the mail item continues on a normal process of delivery through the carrier. The normal process includes delivering the mail to a desired destination represented by the recipient address.

At stage 108, if the address matching software program used by the mailer cannot provide a ZIP+4™ code, the address may be designated as a "problem address" and may undergo a first phase for correction of the address by, for example, the U.S. Postal Service™. The first phase may be referred to as phase one of an address element correction (AEC Phase I or AECI) process. Generally, AECI is a program or an algorithm that corrects or adjusts elements of the address (e.g., such as adjusting the street address or correcting a spelling of a word within the address). A purpose is to correct the address to assist in making a match to a ZIP+4™ code by the address matching software.

At stage 110, a determination is made whether a ZIP+4™ code may be assigned to the address after the adjusting and correcting during the AECI processing. If the ZIP+4™ code is matched and is assigned to the address, the information is returned to the mailer where the mail item is prepared (stage 102) and processed through the normal delivery process of the carrier using the ZIP+4™ code and the delivery point code determined at stage 106.

At stage 111, if the ZIP+4™ code is not assignable to the address after the adjusting and correcting during the AECI processing, a determination is made if the address was previously received and corrected through an AEC Phase II or AECII service. If the address has been previously received and corrected with current address information, the current address information is applied and processed through the normal delivery process of the carrier (Step 113).

At stage 112, if a ZIP+4™ code and a delivery point code are not assigned to the address, method 100 proceeds to a second phase (phase II) of the AEC (AECII), where the problem address may be posted to a website (e.g., an electronic uncoded address resolution system (eUARS) website). The carrier may provide information to update records posted to the website. The mailers, who may be subscribers to a service, may be given access to their address lists through drop off and pick up locations on an Internet website. The mailers may be able to retrieve or view the results from their own lists through the website.

At stage 114, personnel responsible for delivery (e.g., an Address Management System (AMS) office at a district level or a delivery unit) may attempt to resolve the problem address. The AMS may be a database of records that contain delivery address information. There may be AMS offices that are responsible for address maintenance. Address maintenance may include adding new addresses, changing information in existing addresses, or deleting addresses in the database. AMS offices may be resident at area offices and district offices within each area. These locations may be located across the United States.

If attempts to match the address are unsuccessful at the district level, personnel at the AMS may contact a particular delivery unit. The delivery unit may be responsible for physically delivering mail items to the address listed as the problem address or areas near the problem address. Contact with the delivery unit is made using any available means. For example, a hardcopy of the problem address may be sent to delivery units not having access to electronic means. In another example, a facsimile may be sent to the delivery unit. Further, for delivery units that may have access to the Internet or the eUARS website, a notification may be sent to the delivery unit electronically. In any event, the delivery unit attempts to correct or adjust the problem address, match to a delivery point, and assign a ZIP+4™ code. The delivery units are contacted because the delivery unit processing the area of the problem address may be in a greater position to see inaccuracies in the problem address than other personnel. Corrections and/or adjustments may be sent to the district office, which enters the corrections into the eUARS application. Corrections may also be provided for insert into the AMS database. Alternatively, the delivery unit may enter the corrections into the eUARS application. In addition, if the problem address is a new address, the address can be added as a new delivery point into the AMS database, validated as a delivery point, and coded with an appropriate ZIP+4™ code.

Determining the delivery point and ZIP+4™ code electronically saves transportation and sorting costs associated with non-ZIP+4™ coded mail destined for delivery through the carrier. In addition, the carrier, through AECII, may provide updated information to the mailer via a website. In turn, the mailer corrects a list or database associated with the mailer for future mailings. The carrier may also update the AMS database if it is found that the database is in error. Further, the resolution of the address may also be put in a historical table so that if queried again with the same address errors, the postal delivery service may automatically update the address without going through each of the steps outlined in method 100. An e-mail notification may be sent from the eUARS application informing responsible parties that new records are available for correction. The e-mail notification may be sent after a data load of the addresses that require correction.

In one embodiment, instead of mailers sending address records, a customer service center may receive change of address (COA) records. The National Change of Address (NCOA) database of record contains requests to change a mailing address of a postal patron. The NCOA may be associated with the carrier, (e.g., the U.S. Postal Service™). The COA form may have the patron's name, old address, and new address. The NCOA database administrators submit addresses that do not delivery point validate into the eUARS process for resolution and return to the NCOA database. The NCOA database administrators may be an internal Postal customer to eUARS.

Figure 2:
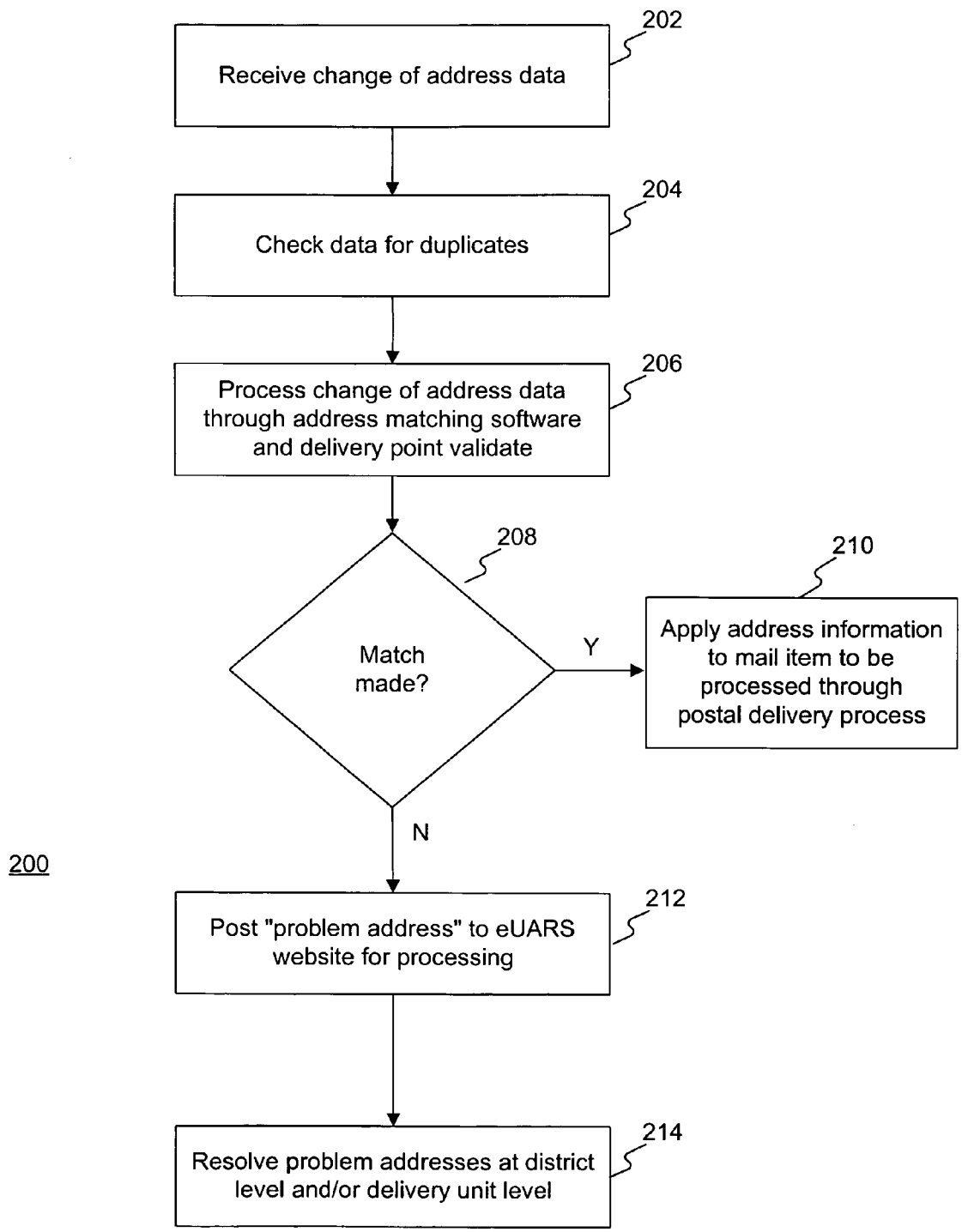
FIG. 2 is a flow chart of a method consistent with an embodiment of the present invention.

FIG. 2 illustrates a flowchart of a method 200 showing an embodiment that includes the COA forms as discussed above. At stage 202, change of address data is received at the customer service center. The change of address data may be a hardcopy form. The NCOA database may receive COA information via hardcopy forms that are mailed to the carrier (e.g., the U.S. Postal Service™), change of address forms received via the Internet, or change of address information submitted via telephone.

At stage 204, the change of address data is quality checked to remove duplicates. A purpose of stage 204 is to remove duplicates and consolidate COA records for more efficient processing of the COA records.

At stage 206, the change of address records are processed through the address matching software. If the new address associated with the COA record successfully validates to a delivery point, the new address record is inserted into the NCOA database and is associated with the delivery point. The new address and delivery point may be transmitted to regional databases (e.g., CFS databases) to be applied to the mail of the customer. Using the new address and delivery point, the mail follows a normal delivery process at stage 210. Regional CFS databases may contain Change of Address information for customers that may fall within their area of delivery support responsibility. If the new address record does not validate to a delivery point at stage 208, the record is submitted to eUARS for processing similar to what occurs for AECII as described in stages 112-114 of FIG. 1. Specifically, at stage 212 the address is posted on the eUARS website and at stage 214 the address is corrected, delivery point validated, and a ZIP+4™ code is assigned. Alternatively, if the address is a new address (i.e., an address that did not exist prior to the customer's COA form), the address may be added as a new delivery point into the AMS database and coded with an appropriate ZIP+4™ code.

Figure 3:
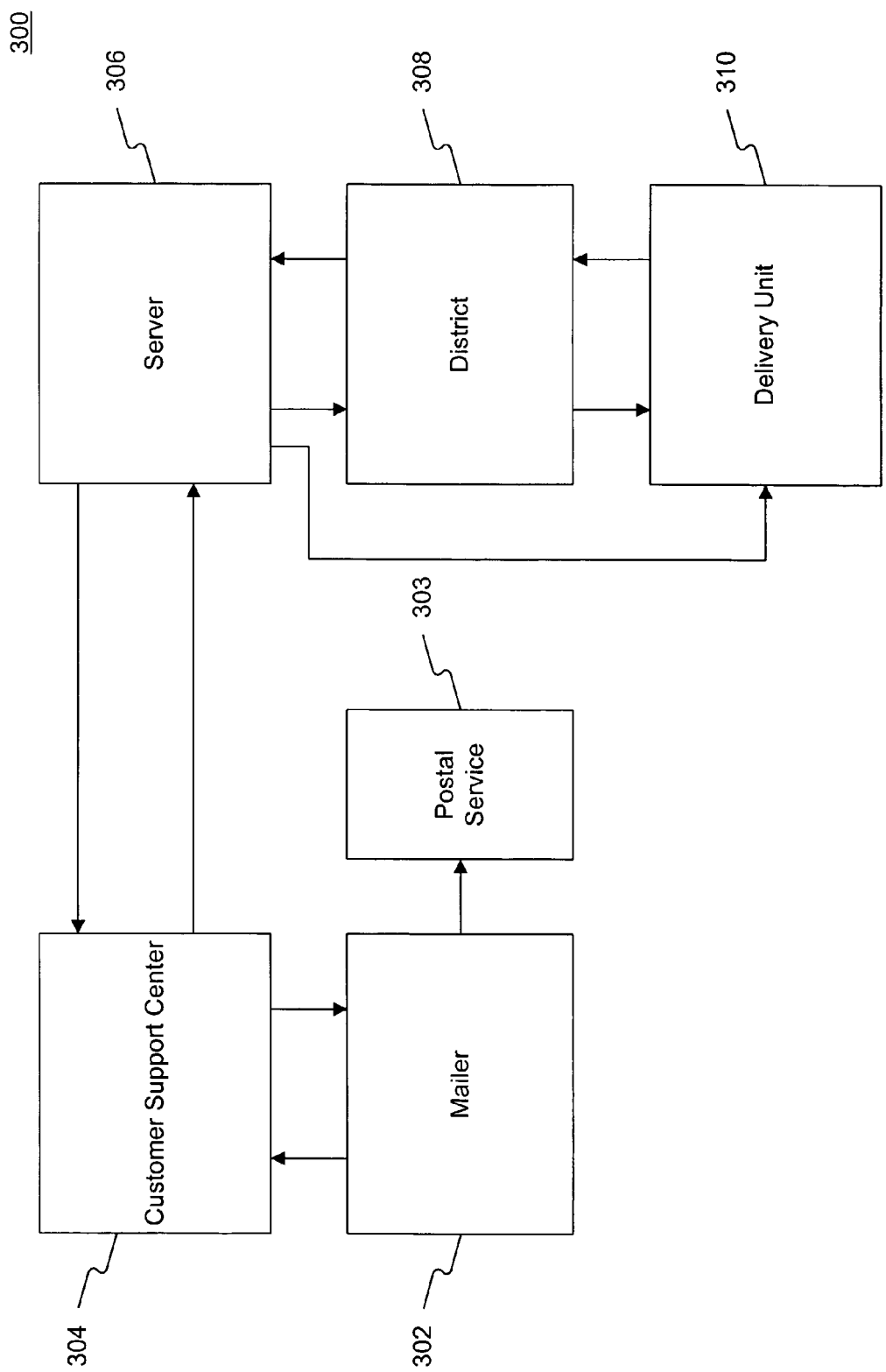
FIG. 3 is an illustration of a system consistent with an embodiment of the present invention.

FIG. 3 illustrates a system 300 consistent with one embodiment of the present invention. System 300 includes mailer 302, postal service 303, support center 304, server 306, district 308, and delivery unit 310.

Mailer 302 may send a mail item to a recipient. The mail item may be a letter, flat, package, or any item that may be handled by the carrier (e.g., the U.S. Postal Service ™). Mailer 302 may use CASS™-certified matching software to match a ZIP+4™ code and may delivery point validate to the address of the recipient. If a match is made, the mail item continues to postal service 303, where the mail item is delivered to the recipient.

If a match is not made, the address is sent to support center 304. Support center 304 may be the National Customer Support Center affiliated with the carrier (e.g., the U.S. Postal Service ™) to handle processing of the address, which may designate an address as a "problem address" when no match has been made by the address to a ZIP+4™ code. A first phase (AECI) for address correction is commenced in which the recipient's address is processed in order to determine a ZIP+4™ code associated with the recipient's address (i.e., a match). The process may include an algorithm that adjusts and/or corrects the recipient's address and processes the adjusted and/or corrected address to find a ZIP+4™ code and may delivery point validate. If a ZIP+4™ code is determined and the address delivery point validates, the address is sent to mailer 302. Mailer 302 may affix the corrected information, including the ZIP+4™ code to the mail item and send the mail item to postal service 303 for delivery.

If the ZIP+4™ code is not resolved under AECI processing, the address may be submitted to a second phase (AECII) for address correction. Specifically, the address may be sent to server 306 where the address is posted on a website (e.g., the eUARS website).

Personnel at district 308 may access the eUARS website through server 306 by using computers resident at district 308. The personnel may attempt to resolve the "problem address," validate the address to a specific delivery point, and match a ZIP+4™ code to the address. If district 308 can successfully validate the address to a specific delivery point and match the address to a ZIP+4™ code, the resolved address is retrieved from the database by support center 304 and sent to mailer 302. Mailer 302 uses the matched ZIP+4™ code to send out the mail piece to postal service 303 for delivery.

If the address cannot be matched to a ZIP+4™ code or validated to a delivery point, the address may be sent to delivery unit 310 in any known manner including a hard copy sent to delivery unit 310 by server 306, a facsimile of the address sent by district 308, or electronically sent by district 308 through an Internet connection. After resolution by personnel associated with delivery unit 310, the address may be entered into server 306 at district 308. If the address is determined to be a new address, an associated ZIP+4™ code and delivery point may be added to the AMS database at district 308.

Processors may be used by each of mailer 302, postal service 303, customer service center 304, server 306, district 308, and delivery unit 310. The processors may be implemented using a personal computer, network computer, mainframe, or other similar microcomputer-based workstation.

The processors may comprise any type of computer operating environment, such as hand-held devices, multiprocessor systems, microprocessor-based or programmable sender electronic devices, minicomputers, mainframe computers, image scanners, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Customer service center 304, mailer 302, postal service 303, server 306, district 308, and delivery unit 310 may also be provided, either separately or in combination, as part of a computer network. The network may comprise, for example, a local area network (LAN), a wide area network (WAN), a wireless wide area network (WWAN), or a wireless local area network (WLAN). Such networking environments are commonplace in offices, enterprise-wide computer networks, intranets, and the Internet, and are known by those skilled in the art. When a LAN is used as the network, a network interface located at any of the processors may be used to interconnect any of the processors. When the network is implemented in a WAN networking environment, such as the Internet, the processors may typically include an internal or external modem (not shown) or other means for establishing communications over the WAN. Further, in utilizing the network, data sent over the network may be encrypted to insure data security by using known encryption/decryption techniques.

In addition to utilizing a wire line communications, a wireless communications system or a combination of wire line and wireless may be utilized as the network in order to, for example, exchange web pages via the Internet, exchange e-mail via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 300 may also transmit data by methods and processes other than, or in combination with, a computer network. These methods and processes may include, but are not limited to, transferring data via, diskette, CD ROM, flash memory sticks, facsimile, conventional mail, an interactive voice response system (IVR), or via voice over a publicly switched telephone network.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A method of matching a delivery code, representing a delivery segment within a geographic location, to an address within the geographic location, said method comprising:
    receiving an incorrect address at a website operated by a server wherein the incorrect address does not match any address in a set of valid addresses;
    sending a transmission to a district office covering a geographic area indicated by the incorrect address from the server requesting correction of the incorrect address;
    determining, at the district office, a corrected address associated with the incorrect address and a delivery code associated with the corrected address;
    receiving, from the district office, the delivery code and the corrected address; and
    saving the corrected address and the delivery code in a database accessible via the server; and
    determining whether the incorrect address has been previously received and previously corrected;
    transmitting the address to an incorrect address website if the incorrect address has not been previously received and previously corrected; and
    applying an updated address to a mail item associated with the incorrect address if the incorrect address has been previously received and previously corrected.

2. The method of claim 1, wherein the delivery code is a ZIP+4 code.

3. The method of claim 1, wherein the incorrect address is a recipient's address for a mail item.

4. The method of claim 3, wherein the mail item is at least one of a letter, flat, or package.

5. The method of claim 1, wherein the server is an electronic uncoded address resolution system (eUARS) server for handling address correction.

6. The method of claim 1, wherein the website is accessible via at least one of an intranet connection and Internet connection.

7. The method of claim 1, further comprising:
    receiving the corrected address from a delivery unit in the event the district office is unable to provide the delivery code associated with the incorrect address.

8. The method of claim 7, wherein the delivery unit is notified of the incorrect address via at least one of a hardcopy of the incorrect address sent via mailing, an electronic copy of the incorrect address sent via the Internet, and a facsimile of the incorrect address sent through a facsimile machine.

9. The method of claim 1, further comprising:
    sending the corrected address to a mailer sending a mail item to a recipient at the incorrect address.

10. The method of claim 9, further comprising:
    mailing the mail item with the corrected address.

11. The method of claim 1, wherein the database is an electronic uncoded address resolution system (eUARS) database.

12. The method of claim 1, wherein receiving the incorrect address at the website occurs after a change of address form, including the incorrect address, is received by a customer service center.

13. The method of claim 1, wherein receiving the incorrect address at the website occurs after a mailer sends a mail item containing the incorrect address and the incorrect address is not matched to the associated delivery code using address matching software.

14. The method of claim 1, further comprising:
performing an address element correction process after sending the transmission to the district office, the address element correction process comprising:
determining whether the incorrect address includes an incorrect street address or a misspelled word;
adjusting the incorrect address to correct the incorrect street address or the misspelled word if a determination is made that the incorrect address includes the incorrect street address or the misspelled word; and
determining whether a preliminary delivery code may be assigned to the incorrect address after the incorrect address is adjusted.

* * * * *